US012311481B1

(12) United States Patent
Xu et al.

(10) Patent No.: US 12,311,481 B1
(45) Date of Patent: May 27, 2025

(54) WELDING METHOD FOR SEA PIPE WITH HIGH EFFICIENCY AND COMPREHENSIVE PERFORMANCE UNDER SHAKING OF PIPE-LAYING SHIP

(71) Applicant: Tianjin University, Tianjin (CN)

(72) Inventors: Lianyong Xu, Tianjin (CN); Kangda Hao, Tianjin (CN); Yongdian Han, Tianjin (CN); Lei Zhao, Tianjin (CN); Wenjing Ren, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/946,775

(22) Filed: Nov. 13, 2024

(30) Foreign Application Priority Data

May 23, 2024 (CN) .......................... 202410648135.2

(51) Int. Cl.
 *B23K 9/173* (2006.01)
 *B23K 101/10* (2006.01)
(52) U.S. Cl.
 CPC .......... *B23K 9/173* (2013.01); *B23K 2101/10* (2018.08)
(58) Field of Classification Search
 CPC ................ B23K 9/173; B23K 2101/04; B23K 2101/06; B23K 2101/10
 See application file for complete search history.

(56) References Cited

U.S. PATENT DOCUMENTS

2010/0176104 A1* 7/2010 Peters .................... B23K 9/092
219/130.21

FOREIGN PATENT DOCUMENTS

WO    WO-2022030162 A1 *  2/2022

* cited by examiner

*Primary Examiner* — Brian W Jennison
(74) *Attorney, Agent, or Firm* — JCIPRNET (57) ABSTRACT

In a field of welding technology, a welding method for a sea pipe with high efficiency and comprehensive performance under shaking of a pipe-laying ship is specifically disclosed. The welding method is as follows: performing ultra-short arc GMAW all-position welding on the sea pipe within a range of heat input of 0.2 kJ/mm~0.3 kJ/mm, while setting a peak current, setting a peak current descent rate to 50 A/ms~70 A/ms, and setting the necking time to 3 ms~7 ms in the GMAW waveform to 285 A~370 A. A welding effect of overall low heat input and partial high heat input is formed, and the stability of all-position welding of the sea pipe is guaranteed, which realizes stable welding of the sea pipe under the condition of pipe-laying ship shaking, and improves the fatigue resistance and corrosion resistance of the sea pipe.

3 Claims, 8 Drawing Sheets

WELDING METHOD FOR SEA PIPE WITH HIGH EFFICIENCY AND COMPREHENSIVE PERFORMANCE UNDER SHAKING OF PIPE-LAYING SHIP

CROSS-REFERENCE TO RELATED APPLICATION

This application claims the priority benefit of China application serial no. 202410648135.2, filed on May 23, 2024. The entirety of the above-mentioned patent application is hereby incorporated by reference herein and made a part of this specification.

BACKGROUND

Technical Field

The disclosure belongs to a field of welding technology, and in particular to a welding method for sea pipes with high efficiency and comprehensive performance under the shaking of a pipe-laying ship.

Description of Related Art

Since the first application on the tension leg platform Auger in the Gulf of Mexico in 1994, the Steel Catenary Riser (SCR) has gained favor in deepwater development due to advantages such as strong resistance to high temperature and high pressure, relatively simple manufacturing processes, and lower costs. However, the complex ocean environment and growing production demands have posed more challenges to the design and manufacturing of the deepwater steel catenary riser.

With the increase in water depth and the extension of riser length, the ocean environment becomes more severe. The generation of underwater vortex-induced oscillations may lead to violent vibrations perpendicular to the direction of water flow and the cylinder axis. Meanwhile, when connected to the platform through the joint, the steel catenary riser may also double an effect of alternating loads. The riser in such a state for a long time may have shortened the lifespan thereof due to frequent operation, thereby causing fatigue failure. In another aspect, during the service process of the pipeline, the root welding pass directly come into contact with the internal gas or liquid. The internal pressure of the pipeline is extremely high with strong corrosiveness, and cracks may generate from the root defects, which leads to pipeline fracture. At the same time, due to frequent sea waves causing the pipe-laying ship to shake, the all-position welding process of the sea pipe is severely affected, thus further increasing the difficulty of sea pipe welding.

SUMMARY

In view of the deficiencies in the related art, the disclosure provides a welding method for a sea pipe with high efficiency and comprehensive performance under the shaking of a pipe-laying ship, aiming to solve the problems of fatigue damage and corrosion fracture that may easily occur in the sea pipe, as well as the difficulty in welding the sea pipe under the shaking of the pipe-laying ship.

According to an aspect of the disclosure, the welding method for a sea pipe with high efficiency and comprehensive performance under shaking of a pipe-laying ship is specifically as follows. Within a range of heat input of 0.2 kJ/mm to 0.3 kJ/mm, ultra-short arc GMAW all-position welding is performed on the sea pipe. Meanwhile, a peak current is set to 285 A to 370 A, a peak current descent rate is set to 50 A/ms to 70 A/ms, and necking time is set to 3 ms to 7 ms in a GMAW waveform, so that a welding effect of overall low heat input and partial high heat input is formed, and stability of all-position welding of the sea pipe under a shaking condition is further guaranteed.

By the technical solution conceived in the disclosure, compared with the related art, since the disclosure adopts low heat input for ultra-short arc GMAW all-position welding, and optimizes parameters in the GMAW waveform, which may guarantee the stability of all-position welding of the sea pipe.

As a further optimization, a welding process of a root reinforcement being less than or equal to 0.5 mm is guaranteed.

As a further optimization, a multi-layer single-pass welding technology with a narrow gap U-shaped groove is adopted for welding.

As a further optimization, parameters of the narrow gap U-shaped groove are: a blunt edge thickness of 1.0 mm to 1.6 mm, a circular arc transition radius of 2.4 mm to 3.2 mm, and a single-side groove angle of 2.5° to 3.5°.

As a further optimization, when the ultra-short arc GMAW technology is used to weld the sea pipe, the welding electric current is 160 A to 200 A, the welding voltage is 12V to 15V, and the welding speed is 450 mm/min to 700 mm/min.

As a further optimization, an arc length of the ultra-short electric arc is 1.5 mm to 2.5 mm.

According to another aspect of the disclosure, a sea pipe welded joint manufactured by the above-mentioned welding method is provided.

In summary, compared with the related art, the technical solutions conceived by the disclosure mainly have the technical advantages as follows.

The disclosure performs the all-position welding of the sea pipe by using the ultra-short arc GMAW technology under the low heat input condition, and optimizes parameters in the GMAW waveform at the same time to achieve a welding effect with overall low heat input and partial high heat input, and ensure the stability of all-position welding of the sea pipe, which thereby realizes stable welding of the sea pipe under the shaking of the pipe-laying ship, and improves the fatigue resistance and corrosion resistance of the sea pipe.

In particular, the disclosure guarantees that the root reinforcement is less than or equal to 0.5 mm during the welding process, which reduces the stress concentration at the root of the joint, and realizes the optimization of the fatigue performance of the joint;

Moreover, the disclosure adopts the multi-layer single-pass welding technology based on the narrow gap U-shaped groove to replace the multi-layer multi-pass welding technology based on the conventional V-shaped groove. The compressing and attracting effect of the arc by the sidewalls on both sides of the groove, as well as the constraining effect on the flow range of the molten pool metal, may avoid the turbulence phenomenon of the molten pool metal under the condition of ship shaking, which may lead to lack of fusion defects in the sidewall, between passes and between layers.

DESCRIPTION OF THE EMBODIMENTS

In order to make the purpose, technical solution, and advantages of the disclosure clearer and comprehensible, the following description provides further details of the disclosure in combination with the drawings and embodiments. It should be understood that the specific embodiments described herein are only used to explain the disclosure and are not intended to limit the disclosure.

According to one aspect of the disclosure, a welding method for a sea pipe with high efficiency and comprehensive performance under shaking of a pipe-laying ship is provided. The specific welding method is as follows. All-position welding is performed on the sea pipe by using an ultra-short arc GMAW (Gas Metal Arc Welding) within a heat input range of 0.2 kJ/mm to 0.3 kJ/mm. Meanwhile, in the GMAW waveform, a peak current is set to 285 A to 370 A, a peak current descent rate is set to 50 A/ms to 70 A/ms, and the necking time is set to 3 ms to 7 ms. A welding effect of overall low heat input and partial high heat input is formed, thereby ensuring the stability of all-position welding of the sea pipe under a shaking condition, and realizing the improvement of SSC (Sulfide Stress Cracking) performance.

In a conventional GMAW, heat input is typically in a range of 0.8 kJ/mm to 1.5 kJ/mm. In the GMAW waveform, the peak current is 250 A to 300 A, the peak current descent rate is 250 A/ms to 300 A/ms, and the necking time is 1.5 ms to 2.5 ms. It is considered that due to excessive heat input in the conventional GMAW, the root formation (excessive root reinforcement and insufficient transition radius) is one of the key factors leading to stress concentration and fatigue failure. To improve the fatigue resistance performance of the sea pipe, the disclosure achieves root formation improvement by reducing heat input. However, under the low heat input condition, the electromagnetic force and arc pressure generated by the arc in all-position welding, especially in the overhead welding position, are insufficient to guarantee the stability of the welding process. The influence of gravity on the molten pool metal causes uneven magnetic fields on both sides of the groove sidewalls, leading to arc deflection. Meanwhile, under these conditions, due to the rapid cooling effect of the molten pool metal, martensite structure is formed, and the SSC performance of the joint is insufficient. Therefore, the disclosure adopts two methods to improve the GMAW waveform and the ultra-short arc technology under the low heat input condition. First, the peak current is increased to enhance arc pressure, the peak current descent rate is reduced to avoid current fluctuations caused by wire retraction, and the necking time is extended to increase the duration of arc force on molten droplets. Second, the ultra-short arc technology is adopted to generate greater electromagnetic force to overcome the anti-gravity effect of the molten droplets.

Specifically, under the low heat input condition, the GMAW waveform may be adjusted to increase the peak current, the peak current descent rate is reduced, and the necking time is extended. The increase in peak current may significantly increase the arc pressure, offsetting part of the gravity effect of the molten pool metal, which causes more liquid metal in the molten pool to be displaced towards the rear of the molten pool, and thereby prolongs the existing time of the molten droplet on the welding wire. The reduction in the peak current descent rate may effectively avoid current fluctuations caused by wire retraction. The extension of the necking time increases the duration of the force of the arc on the molten droplet, prolonging the time required for droplet detachment. The continuous electromagnetic force may offset part of the gravity effect on the molten pool. The combination of these factors guarantees the stability of all-position welding of the sea pipe. Moreover, the increase in the peak current leads to an increase in average current and heat input, which is beneficial for reducing the hardness of the joint and improving the SSC performance thereof. On one hand, in conjunction with the ultra-short arc technology, the electromagnetic force greater than the conventional GMAW may be generated to overcome the anti-gravity effect of the molten droplets, which promotes short-circuit transition of droplets, and is combined with waveform adjustment to ensure the stability of the all-position welding process of the sea pipe. On the other hand, the effect of the arc may be reduced on the sidewall, which promotes the compression of arc heat in the molten pool area and forms the effect of the overall low heat input and partial high heat input. The combination of the increase in the peak current, the reduction in the peak current descent rate, and the extension of the necking time improves the stability of droplet transition under the ship shaking condition of the pipe-laying ship, which avoids the generation of lack of fusion defects under the low heat input, and achieves a maximum Vickers hardness of ≤248HV10 for the joint and meeting the NACE0177 standard in the corrosion SSC test.

Further, the welding process of the root reinforcement being less than or equal to 0.5 mm is guaranteed, in order to reduce the stress concentration at the root of the joint, ensure that the fatigue performance of the joint may meet the service requirements of the sea pipe under alternating loads, and avoid fatigue failure.

Further, for the all-position welding of the sea pipe, due to the shaking of the pipe-laying ship caused by the frequent sea waves, if the conventional multi-layer multi-pass GMAW welding technology based on the V-shaped groove is adopted, the molten pool metal may experience significant turbulence under the hull shaking condition. For one thing, the molten pool metal may not achieve good fusion with the sidewall; for another, the molten pool metal affects the welding quality of the next pass and the next layer after flowing to the next weld pass area, which easily induces lack of fusion defects in the sidewall, between passes and between layers. Therefore, it is preferable to adopt a multi-layer single-pass welding technology based on a narrow gap U-shaped groove for welding. Due to the compression and attraction effect of the sidewalls on both sides of the groove on the electric arc and the constraining effect on the flow range of the molten pool metal, the molten pool metal may still maintain in the center of the groove under the condition of ship shaking, avoiding the lack of fusion defects in the sidewall, between passes and between layers caused by turbulence of the molten pool metal under the condition of ship shaking. At the same time, the parameters of the narrow gap U-shaped groove are preferably optimized as: a blunt edge thickness 1.0 mm~1.6 mm, an arc transition radius 2.4 mm~3.2 mm, a single-side groove angle 2.5° ~3.5°, which realizes multi-layer single-pass welding under such a condition.

Further, when the ultra-short arc GMAW technology is used to weld the sea pipe, a welding electric current may be 160 A to 200 A, a welding voltage is 12V to 15V, and a welding speed is 450 mm/min to 700 mm/min.

Further, the arc length of the ultra-short arc is 1.5 mm to 2.5 mm. At the arc length, a greater electromagnetic force may be generated to overcome the anti-gravity effect of the molten droplet, promote the short-circuit transition of the molten droplet, and cause the arc heat to be locally compressed in the molten pool metal region to improve the stability of the electric arc.

Further, the disclosure may adopt robots to realize fully automatic welding of the sea pipe at 5G position, or may adopt track trolleys to realize fully automatic welding of the sea pipe.

According to another aspect of the disclosure, a sea pipe welding joint prepared by the aforementioned welding method is provided. The fatigue performance of the sea pipe with the welding joint is superior to acceptance curves of BS7608 D and BS7608 E, with fatigue strength approximately 40% higher than the BS7608 E curve. The maximum Vickers hardness of the joint is ≤248HV10, and the corrosion SSC test meets the NACE0177 standard. Therefore, the sea pipe prepared by the welding method provided in the disclosure may meet the service requirements under alternating loads.

The technical solution provided by the disclosure is further explained below according to specific examples.

Example 1

Figure 2:
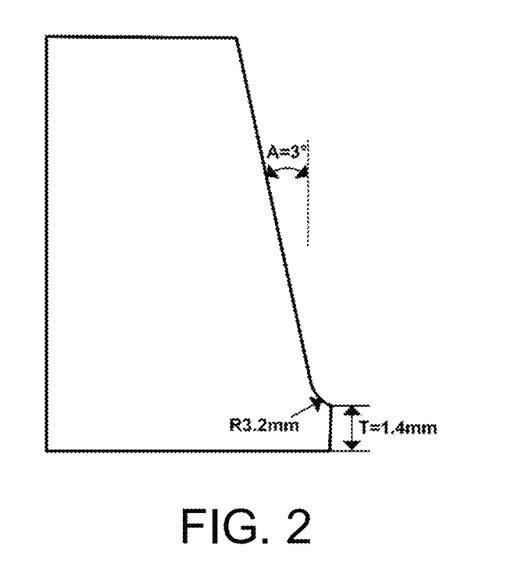
FIG. 2 is a schematic diagram of groove design according to Examples 1 to 5 of the disclosure.

In this embodiment, the material to be welded is a 12-inch API 5L X65 erect, adopting a narrow gap U-shaped groove as shown in FIG. 2. The parameters of the butt welding technology are: a welding electric current of 185 A, a welding voltage of 13.5 V, a welding speed of 500 mm/min, and a heat input of 0.24 kJ/mm. In the GMAW waveform, the peak current is 360 A, the peak current descent rate is 60 A/ms, the necking time is 4.8 ms, and the arc length is 2 mm.

Figure 1:
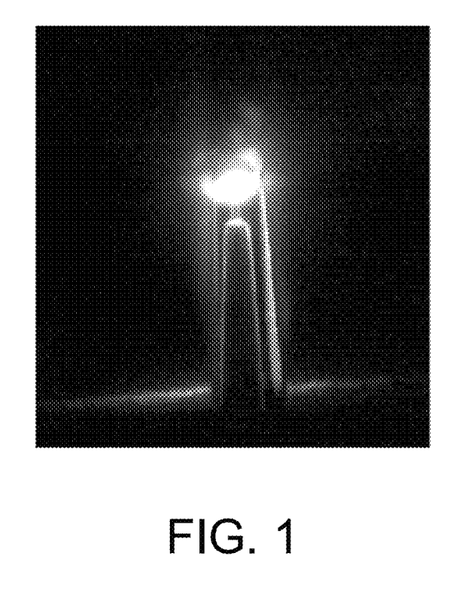
FIG. 1 is an electric arc shape according to Example 1 of the disclosure.
Figure 3:
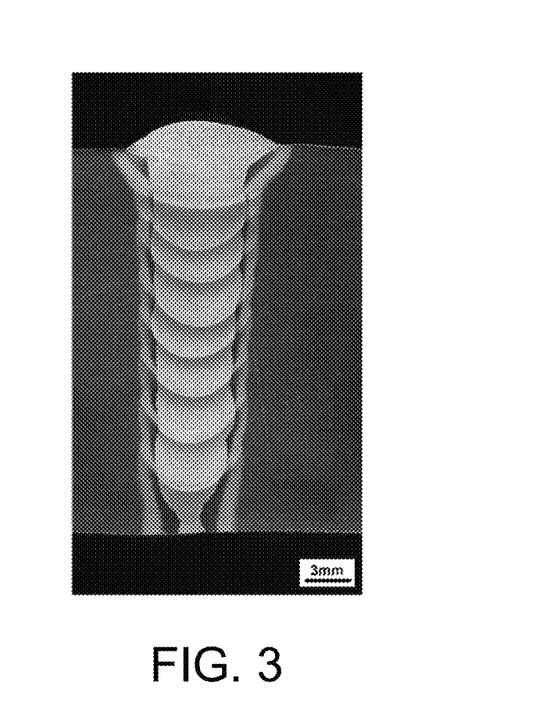
FIG. 3 shows macroscopic morphology of a joint according to Example 1 of the disclosure.
Figure 4:
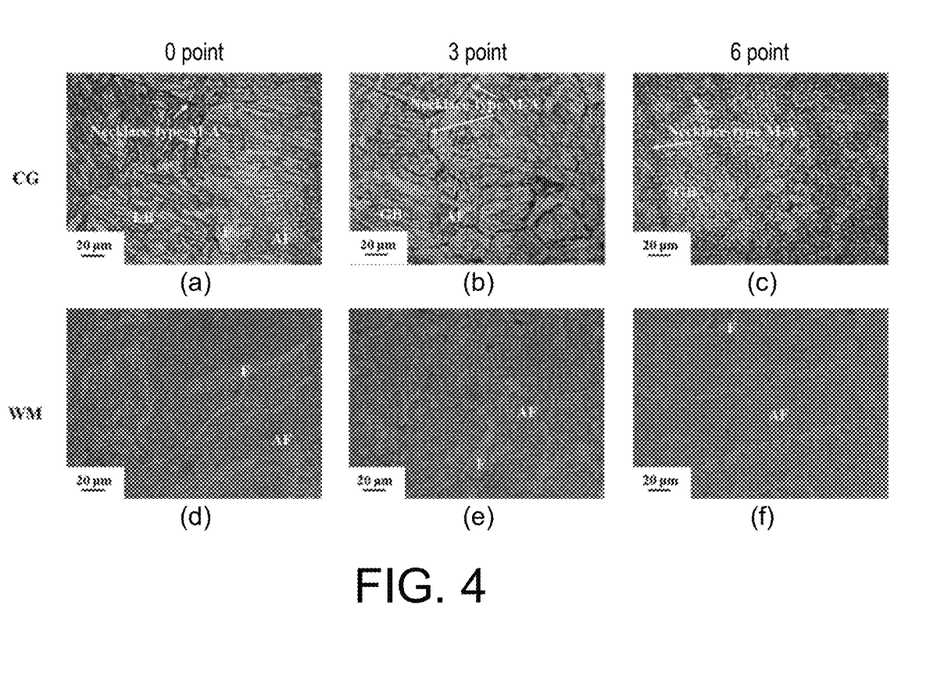
FIG. 4 shows a microstructure of the joint according to the Example 1 of the disclosure, where (a) is a coarse-grained (CG) zone image of a heat-affected zone at the 0 point position, (b) is a CG image at the 3 point position, (c) is a CG image at the 6 point position, (d) is a welded seam (WM) image at the 0 point position, (e) is a WM image at the 3 point position, and (f) is a WM image at the 6 point position.
Figure 5:
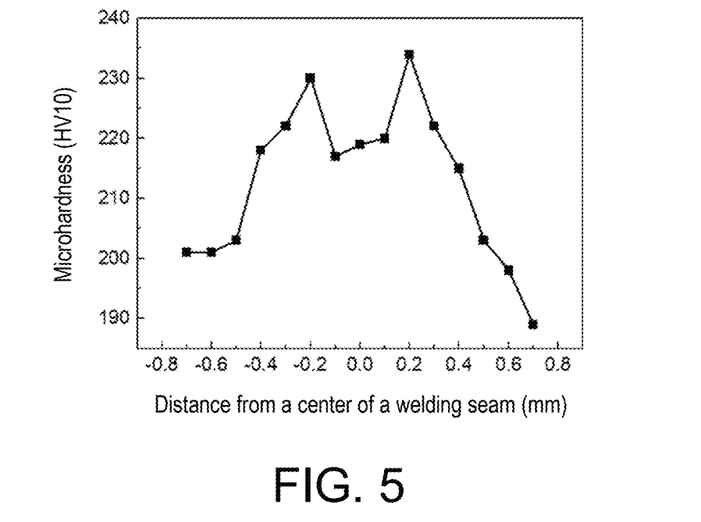
FIG. 5 is a microhardness distribution of the joint according to Example 1 of the disclosure.
Figure 6:
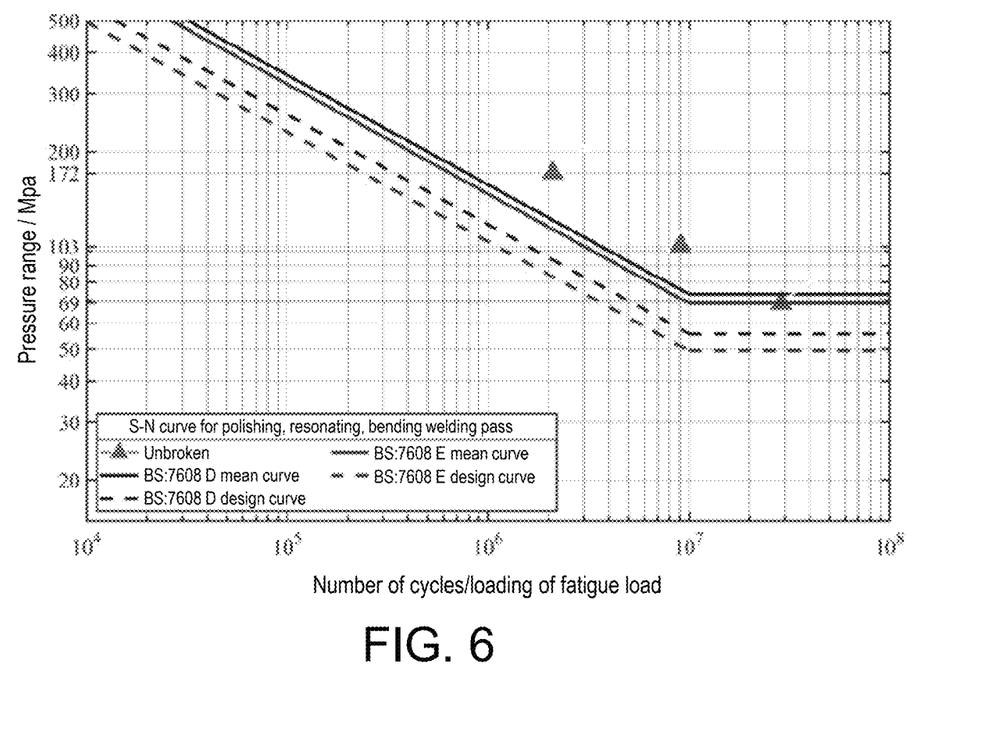
FIG. 6 is an S-N curve of a joint fatigue test according to Example 1 of the disclosure.
Figure 7:
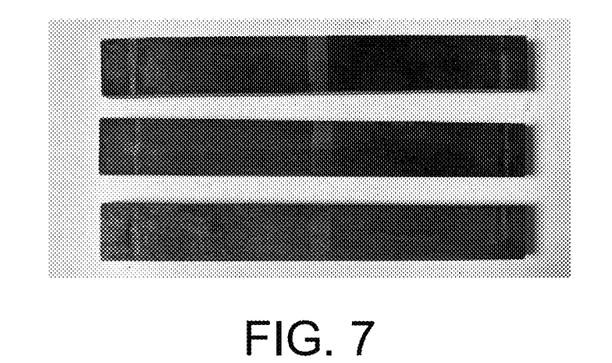
FIG. 7 shows surface morphology of the joint after SSC testing according to Example 1 of the disclosure.
Figure 8:
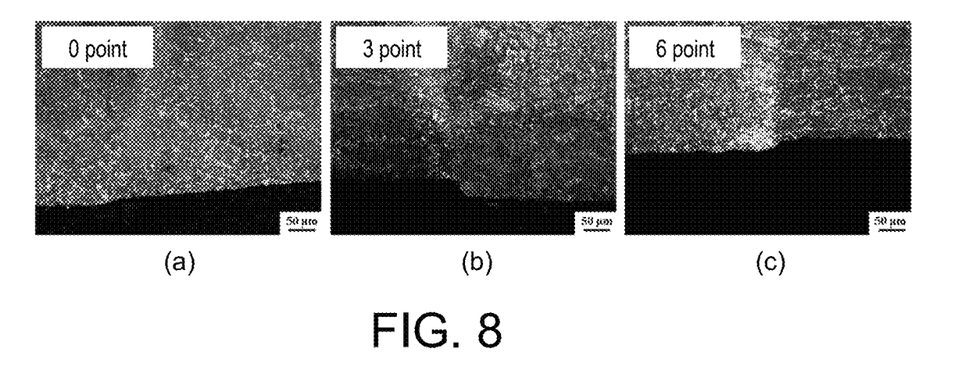
FIG. 8 shows side morphology of the joint after SSC testing according to Example 1 of the disclosure, where (a) is the 0 point position, (b) is the 3 point position, and (c) is the 6 point position.

The welding process is stable, with the molten pool metal located at the center of the groove, and the electric arc does not deflect, as shown in FIG. 1. The macroscopic morphology of the joint shows no lack of fusion defects, as shown in FIG. 3. In terms of microstructure, the coarse-grained heat-affected zone at the 0 point position is mainly composed of lath bainite, ferrite, and chain-like M-A constituents, while the coarse-grained zones at the 3 point position and the 6 point position are mainly composed of granular bainite, ferrite, and chain-like M-A constituents, with no brittle martensite or other hard structures appearing at any position, as shown in FIG. 4. The maximum hardness value is less than 235HV10, occurring in the heat-affected zone, as shown in FIG. 5. The S-N curve with 95% confidence interval indicates that no fatigue failure occurs after reaching the runout value at medium and low stress levels, while fatigue fracture failure occurs at a high stress level of 172 MPa, and the fatigue performance is superior to acceptance curves of both Grade D and Grade E of BS 7608, with fatigue strength 38% higher than the BS7608E curve, as shown in FIG. 6. After 720 hours of testing, the SSC specimen was examined on the tensile surface under a low-power microscope with a magnification of ×10, showing no cracks or fissures on the tensile surface, as shown in FIG. 7, which indicates that the specimen is not sensitive to sulfide stress corrosion cracking or stress-oriented hydrogen-induced cracking under the aforementioned test conditions, and meets the DNV-OS-F101 standard. After the specimen is cut and the root cross-section is observed, no microcracks are found, as shown in FIG. 8.

Example 2

In this embodiment, the material to be welded is a 12-inch API 5L X65 riser, adopting a narrow gap U-shaped groove. The parameters of the butt welding process are: a welding electric current of 160 A, a welding voltage of 15 V, a welding speed of 450 mm/min, and a heat input of 0.26 kJ/mm. In the GMAW waveform, the peak current is 285 A, the peak current descent rate is 65 A/ms, the necking time is 6 ms, and the arc length is 1.5 mm.

Example 3

In this embodiment, the material to be welded is a 12-inch API 5L X65 riser, adopting a narrow gap U-shaped groove. The parameters of the butt welding process are: a welding electric current of 170 A, a welding voltage of 12 V, a welding speed of 500 mm/min, and a heat input of 0.23 kJ/mm. In the GMAW waveform, the peak current is 300 A, the peak current descent rate is 50 A/ms, the necking time is 3 ms, and the arc length is 2.5 mm.

Example 4

In this embodiment, the material to be welded is a 12-inch API 5L X65 riser, adopting a narrow gap U-shaped groove. The parameters of the butt welding process are: a welding electric current of 200 A, a welding voltage of 15 V, a welding speed of 700 mm/min, and a heat input of 0.21 kJ/mm. In the GMAW waveform, the peak current is 370 A, the peak current descent rate is 70 A/ms, the necking time is 5 ms, and the arc length is 1.8 mm.

Example 5

In this embodiment, the material to be welded is a 12-inch API 5L X65 riser, adopting a narrow gap U-shaped groove. The parameters of the butt welding process are: a welding electric current of 190 A, a welding voltage of 13 V, a welding speed of 600 mm/min, and heat input of 0.20 KJ/mm. In the GMAW waveform, the peak current is 320 A, the peak current descent rate is 55 A/ms, the necking time is 7 ms, and the arc length is 2.2 mm.

Comparative Example 1

Figure 9:
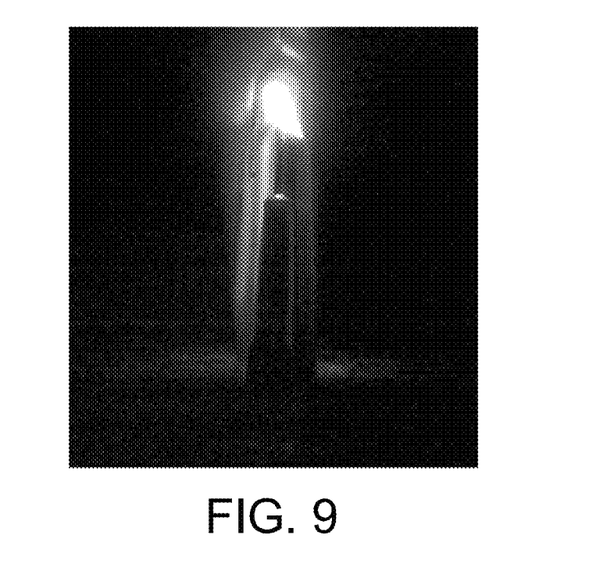
FIG. 9 shows electric arc morphology according to Comparative Examples 1 and 2 of the disclosure.
Figure 10:
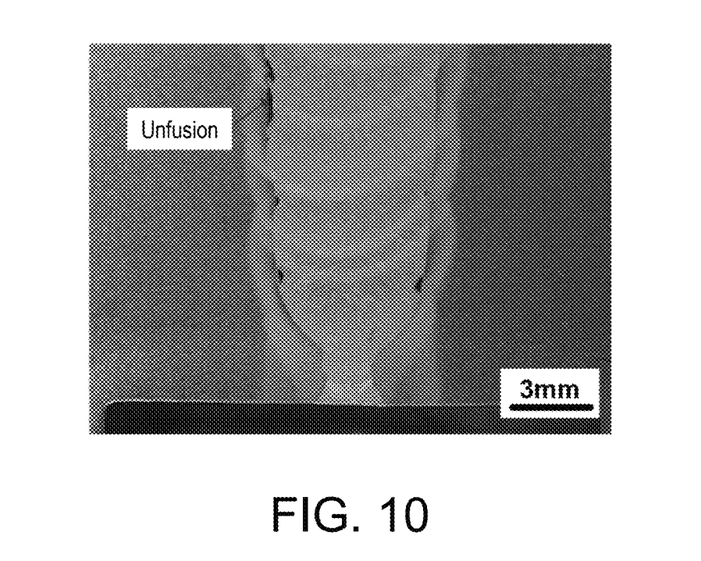
FIG. 10 shows macroscopic morphology of a joint according to Comparative Example 1 of the disclosure.
Figure 11:
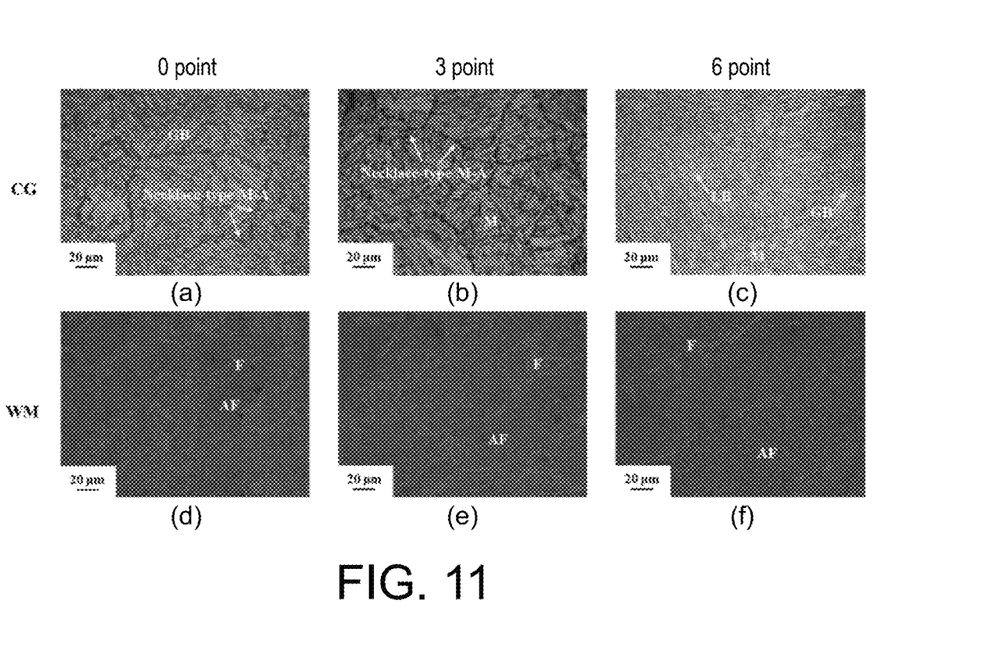
FIG. 11 shows a microstructure of the joint according to the Comparative Example 1 of the disclosure, where (a) is a coarse grained (CG) zone image of a heat-affected zone at the 0 point position, (b) is a CG image at the 3 point position, (c) is a CG image at the 6 point position, (d) is a weld seam (WM) image at the 0 point position, (e) is a WM image at the 3 point position, and (f) is a WM image at the point position.
Figure 12:
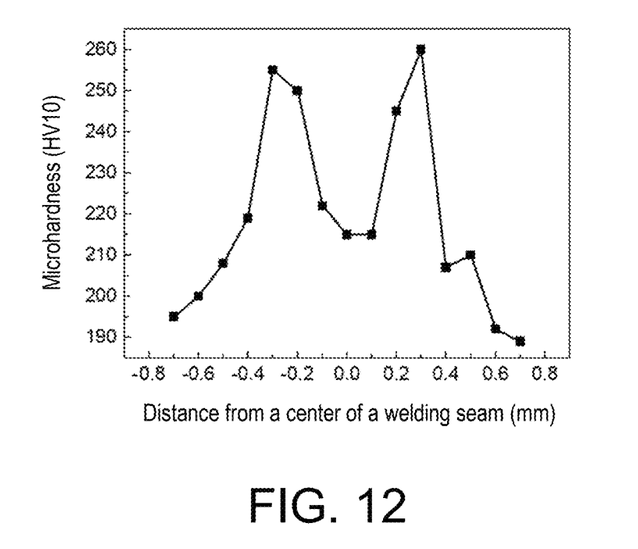
FIG. 12 shows microhardness distribution of the joint according to Comparative Example 1 of the disclosure.

Consistent with Example 1, Comparative Example 1 only differs in the arc length of 4 mm. During the welding process, the electric arc is attracted and deflected by the sidewall, as shown in FIG. 9. The macroscopic morphology of the joint reveals obvious lack of fusion defects, as shown in FIG. 10. In terms of microstructure, the coarse-grained heat-affected zone at the 0 point position is mainly composed of granular bainite and coarse chain-like M-A constituents; the coarse-grained zone at the 3 point position mainly consists of martensite and chain-like M-A constituents; the coarse-grained zone at the 6 point position mainly consists of granular bainite, lath bainite, and martensite, as shown in FIG. 11. Due to the formation of martensite, the maximum hardness of the joint reaches 260HV10, all occurring in the heat-affected zone, as shown in FIG. 12.

Figure 13:
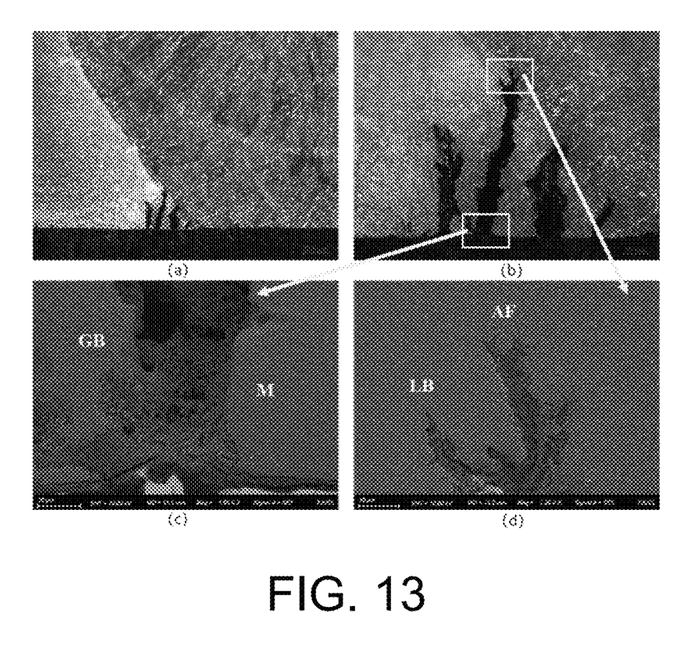
FIG. 13 shows welded joint crack expansion of the joint at the 0 point position after SSC testing according to Comparative Example 1 of the disclosure, where (a) shows the crack morphology near a coarse-grained zone of a heat-affected zone, (b) is an enlarged view of crack morphology in (a), and (c) and (d) are enlarged views of circled portions in (b).
Figure 14:
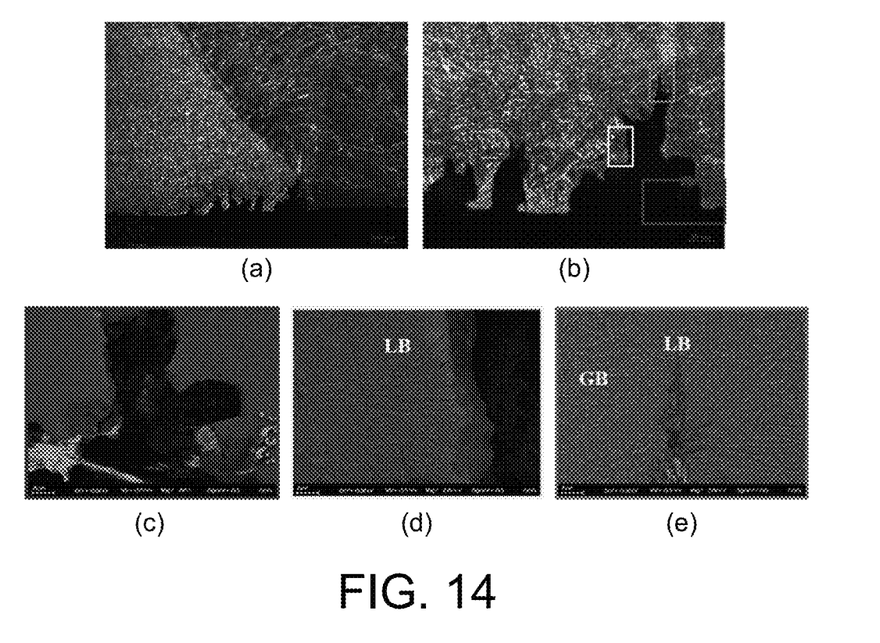
FIG. 14 shows the welded joint crack expansion of the joint at the 3 point position after SSC testing according to Comparative Example 1 of the disclosure, where (a) shows crack morphology near a coarse-grained zone of a heat-affected zone, (b) is an enlarged view of crack morphology in (a), (c) is an enlarged view of a red-framed portion in (b), (d) is an enlarged view of a yellow-framed portion in (b), and (e) is an enlarged view of a blue-framed portion in (b).
Figure 15:
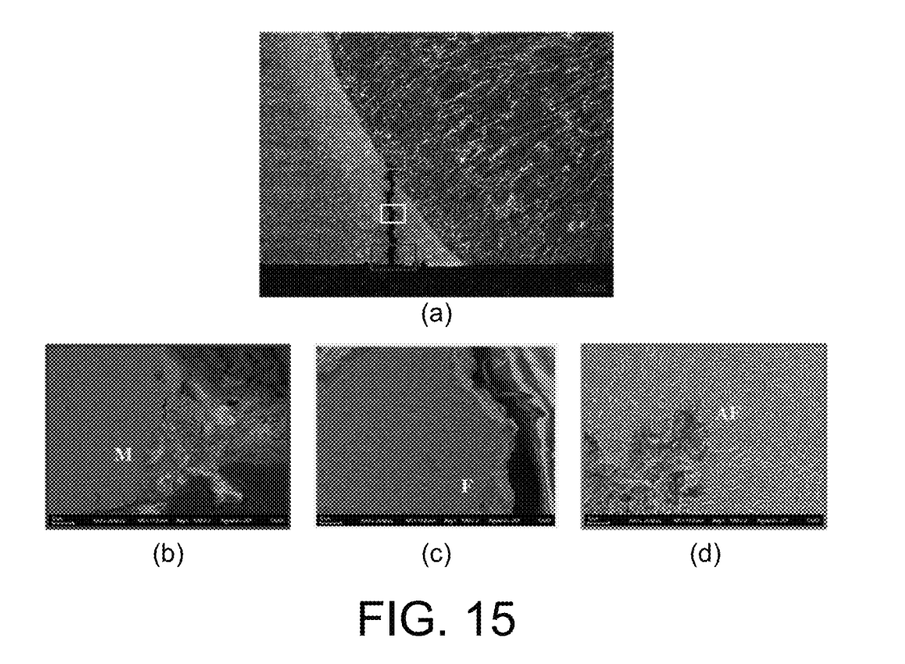
FIG. 15 shows welded joint crack expansion of the joint at the 6 point position after SSC testing according to Comparative Example 1 of the disclosure, where (a) shows crack morphology near a coarse-grained zone of a heat-affected zone, (b) is an enlarged view of a red-framed portion in (a), (c) is an enlarged view of a yellow-framed portion in (a), and (d) is an enlarged view of a blue-framed portion in (a).

After 720 hours of testing, the SSC specimen was examined on the tensile surface under a low-power microscope with a magnification of ×10. Microcracks were found on the force-bearing side of the weld root. After the SSC specimen is cut for observing the root section, cracks in the welded joint at the 0 point position mainly initiated in the martensite of the coarse-grained zone and expanded along the martensite and bainite. When the cracks expanded to the acicular ferrite in the weld or when the expansion direction was perpendicular to the direction of lath bainite, the crack expansion stopped, as shown in FIG. 13. Cracks in the welded joints at the 3 point position and 6 point position mainly initiated in the martensite of the coarse-grained zone and expanded along the martensite or bainite. The crack at the 3 point position stopped expanding when reaching the area perpendicular to the lath bainite (as shown in FIG. 14), while the crack at the 6 point position stopped expanding when reaching the weld due to the inhibitory effect of acicular ferrite (as shown in FIG. 15).

Comparative Example 2

Figure 16:
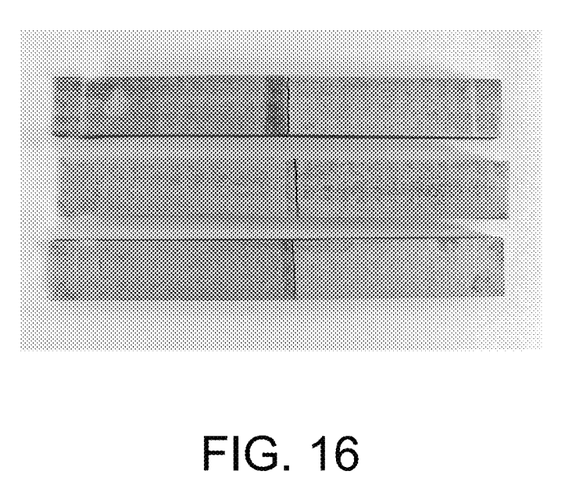
FIG. 16 is a surface morphology image of a joint after SSC testing according to Comparative Example 2 of the disclosure.

Consistent with Example 1, Comparative Example 2 only differs in the peak current of 260 A in the waveform, the peak current descent rate of 280 A/ms, and the necking time of 2 ms. During the welding process, the electric arc is attracted by the sidewall and deflected (as shown in FIG. 9), and the maximum hardness of the joint is higher than that of Comparative Example 1, reaching 285HV10. After 720 hours of testing, the SSC specimen was examined on the tensile surface under a low-magnification microscope with a magnification of ×10, and obvious cracks were found on the weld root stress side (as shown in FIG. 16).

Persons skilled in the art may easily understand that the above description is only a preferred implementation of the disclosure, and is not intended to limit the disclosure. Any modifications, equivalent replacements and improvements made within the spirit and principles of the disclosure should be included in the protection scope of the disclosure.

What is claimed is:

1. A welding method for a sea pipe with high efficiency and comprehensive performance under shaking of a pipe-laying ship, the welding method comprising: performing ultra-short arc GMAW (gas metal arc welding) all-position welding on the sea pipe within a range of heat input of 0.2 kJ/mm~0.3 kJ/mm, wherein the ultra-short arc GMAW is performed with an arc length of 1.5 mm to 2.5 mm, simultaneously setting a peak current to 285 A~370 A, setting a peak current descent rate to 50 A/ms~70 A/ms, and setting necking time to 3 ms~7 ms in a GMAW waveform, and simultaneously adopting a multi-layer single pass welding based on a narrow gap U-shaped groove for welding, wherein parameters of the narrow gap U-shaped groove are: a blunt thickness of 1.0 mm to 1.6 mm, a circular arc transition radius of 2.4 mm to 3.2 mm, and a single-side groove angle of 2.5° to 3.5°,
   wherein the welding of a root reinforcement is less than or equal to 0.5 mm, so that a welding effect of overall low heat input and partial high heat input is formed.

2. The welding method for the sea pipe with the high efficiency and the comprehensive performance under the shaking of the pipe-laying ship according to claim 1, wherein when the ultra-short arc GMAW is applied to weld the sea pipe, a welding electric current is 160 A to 200 A, a welding voltage is 12V to 15V, and a welding speed is 450 mm/min to 700 mm/min.

3. A sea pipe welded joint manufactured by the welding method according to claim 1.

* * * * *